April 26, 1949.  E. K. WOLFE  2,468,532
COMBINATION KIDDY-CAR AND ARTICLE CARRIER
Filed Nov. 3, 1945
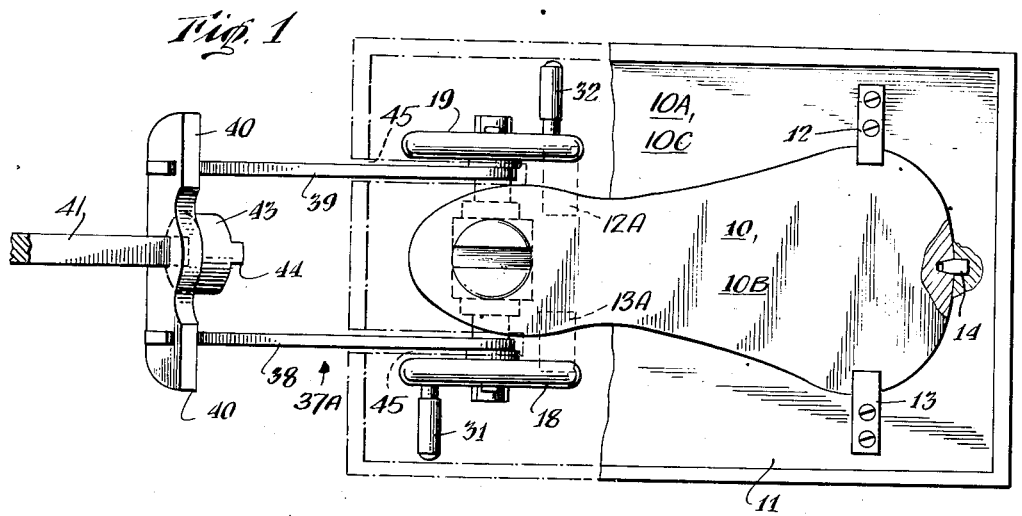
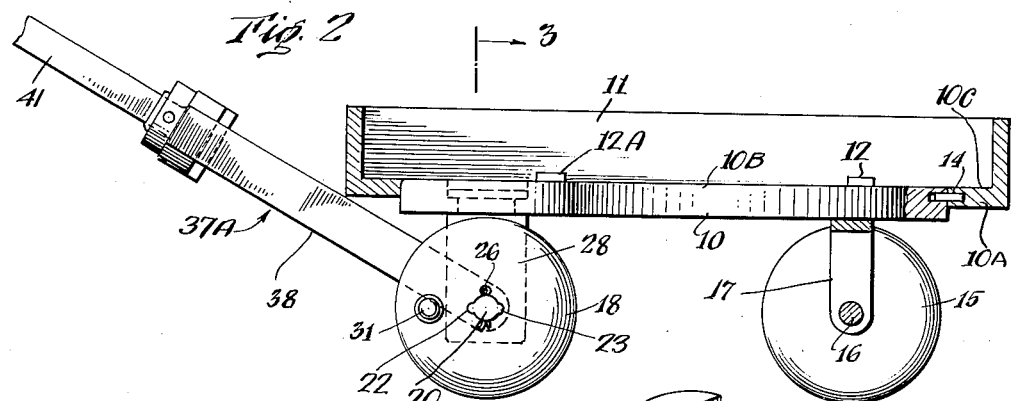
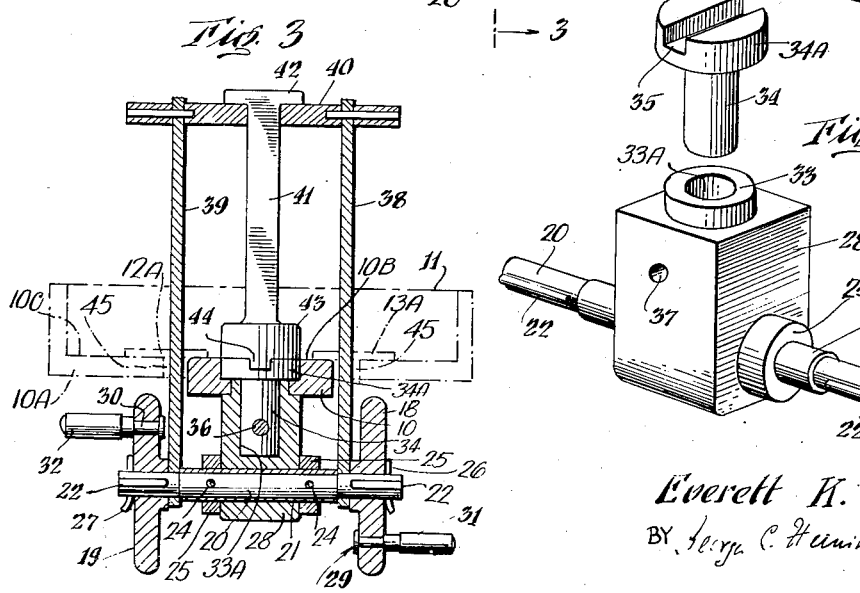
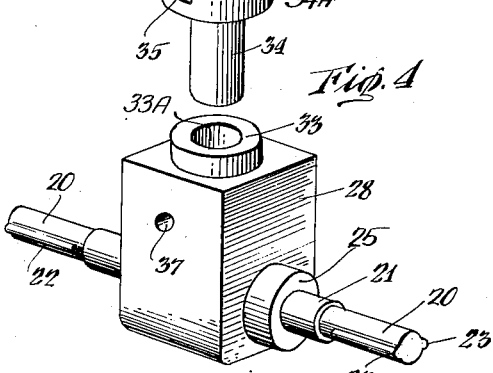
INVENTOR
Everett K. Wolfe
BY George C. Hunior
ATTORNEY Patented Apr. 26, 1949

2,468,532

UNITED STATES PATENT OFFICE 2,468,532

COMBINATION KIDDY-CAR AND ARTICLE CARRIER

Everett K. Wolfe, St. Albans, N. Y.

Application November 3, 1945, Serial No. 626,497

1 Claim. (Cl. 280—259)

My invention relates to improvements in vehicles, particularly to a combination kiddy-car and article carrier and is especially intended as an improvement on the vehicle forming the object of my co-pending application Serial No. 578,214 filed February 16, 1945.

It is one of the main objects of the present application to provide the vehicle with means to propel the car by means of a special construction of front axle, front wheels and pedals.

Another object of my invention is the provision of a novel steering mechanism for the front wheels adapted to be operated by the child when riding the vehicle and by the handle when the vehicle is pulled during a shopping expedition, etc.

A further object of my invention is to provide a combined kiddy-car and delivery wagon, the child's seat of which can be readily removed from or attached to the tray or box-like body.

A still further object of my invention is to provide a vehicle of the above character, the handle bar of which can be extended or contracted and which is simply and inexpensively constructed, yet durable and highly efficient in use.

These and other objects and advantages of my invention will become more fully known as the description thereof proceeds and will then be more specifically defined in the appended claims.

In the accompanying drawing forming a material part of this disclosure:

Fig. 1 is a top plan view of a vehicle constructed according to my invention.

Fig. 2 is a sectional side elevation thereof.

Fig. 3 is a cross section on line 3—3 of Fig. 2.

Fig. 4 is a perspective detail view of the front axle support.

The seat 10 of the kiddy car forms part of the floor portion 10A of the tray or box 11, the top surfaces 10B, 10C of the seat 10 and floor portion 10A respectively extending in a common plane as best shown in Figures 2 and 3. Cleats 12, 12A, 13, 13A engage the top surface 10B of seat 10 to hang the tray portion 11 therefrom, while seat 10 and tray 11 are further positioned relatively one to the other by the key 14 extending into recesses in both. Rear wheels 15 are mounted on axle 16, the latter being mounted in hangers 17 rigidly fixed to the bottom of seat 10.

The front wheels 18, 19 are keyed to the end portions of axle 20 which is non-rotatably mounted in bushing 21. The keys 22, 23 may be comprised integrally by axle 20 as illustrated or may be separate members. As illustrated, dowel pins 24 extend transversely through axle 20, bushing 21 and collars 25, the wheels 18, 19 being positioned on axle 20 against outward axial movement by cotter pins 26, 27, while axle 20 is positioned against axial movement relative to block 28 by the collars 25. The shafts 29, 30 of pedals 31, 32 are eccentrically mounted on the wheels 18, 19, which, as illustrated, are solid discs. The shafts 29, 30 are mounted diametrically opposite of axle 20 to which both wheels are keyed, so that use of the pedals causes axle 20 and bushing 21 to rotate in block 28. A particular advantage of the above construction is that, if bushing 21 is of metal, the wheels 18, 19, axle 20, dowels 24, collars 25, block 28 and pedals 31, 32 may all be of wood, which is generally a cheaper material to purchase and fabricate.

Block 28 comprises a collar 33 and is formed with a substantially vertically extending bore 33A coaxially within collar 33. A large dowel 34 fits into bore 33A and has its head 34A formed with the transversely extending slot 35 and is fixed against rotation relative to block 28 by the pin 36 extending through hole 37 of block 28 and through dowel 34.

The frame 37A comprises the side pieces 38, 39 rotatably mounted on axle 20 between bushing 21 and the wheels 18, 19 respectively and joined at their free ends by the yoke 40. The shaft 41 is slidably mounted in yoke 40 for motion longitudinal of frame 37A, and comprises the handle 42 at its outer end, and the head 43 at its inner end, the head 43 comprising the lip 44 engageable in slot 35 when shaft 41 is in telescoped relation to frame 37A and when frame 37A is in substantially vertical position as shown in Figure 3. In such a vertical position, the side members 38, 39 extend through slots 45 formed in the floor portion 10A of tray 11.

In operation, the vehicle is a kiddy car when tray 11 is removed, and may be steered by means of yoke 40 in its vertical position through shaft 41 which rotates block 28 for steering. The vehicle is propellable by means of the pedals, or may be pulled and steered by means of shaft 41 and handle 42 in extended position as shown in Figures 1 and 2. The vehicle may also be pulled and steered by shaft 41 and handle 42 when tray 11 has been put in place to constitute the vehicle an article carrier.

It will be understood that I have shown and described the preferred form of my invention as an example only of the many possible ways to practically make the same and that I may make such changes in the general arrangement and in the construction of the minor details as come within the scope of the appended claim without departure from the spirit of my invention and the principles involved.

Having thus described by invention, what I claim as new and desire to secure by Letters Patent is:

In a child's vehicle, the combination with a seat portion and rear wheels operatively connected thereto, of a block pivotally connected to said seat portion near the front thereof for rotation about a substantially vertical axis, a front axle rotatably mounted in said block and fixed against axial movement relative thereto, front wheels keyed to said axle pedals eccentrically mounted on said wheels diametrically opposite of said axle, a bushing operatively disposed between said block and said axle, and means for fixing said axle against axial movement relative to said block, said means comprising collars mounted on said bushing at either side of said block and dowel pins extending through said collars, bushing and axle.

EVERETT K. WOLFE.

REFERENCES CITED

The following references are of record in the file of this patent:

UNITED STATES PATENTS

| Number | Name | Date |
| --- | --- | --- |
| 1,203,831 | Wittman | Nov. 7, 1916 |
| 1,235,489 | Kolkmann | July 31, 1917 |
| 1,286,539 | Colon | Dec. 3, 1918 |
| 1,306,916 | Koontz | June 17, 1919 |
| 1,333,292 | Case | Mar. 9, 1920 |
| 1,355,199 | Wickman | Oct. 12, 1920 |
| 1,470,441 | Green | Oct. 9, 1923 |
| 1,590,057 | Raasch | June 22, 1926 |
| 1,849,341 | Waas | Mar. 15, 1932 |
| 2,409,803 | Schneider | Oct. 22, 1946 |